JOHN DiPERRY
INVENTOR.

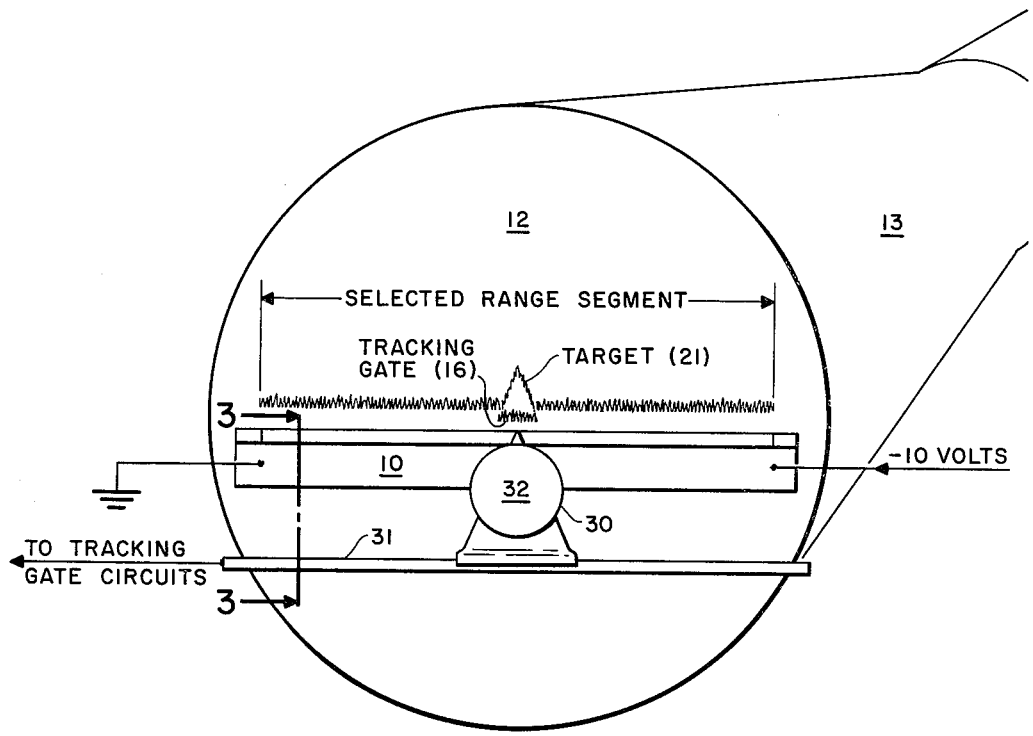
FIG. 2
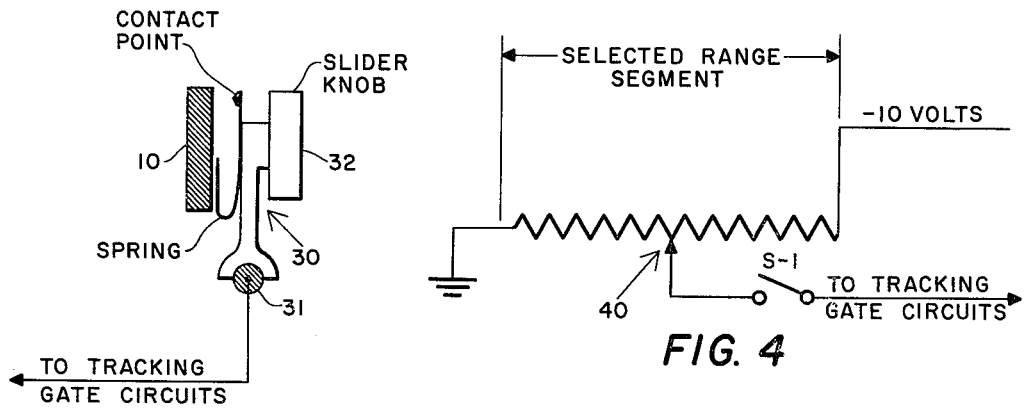
FIG. 3
FIG. 4
JOHN DiPERRY
INVENTOR.
BY J. M. St. Amand
ATTORNEY 3,217,320
MANUAL PROBE TRACKING SYSTEM
John Di Perry, Riverside, Calif., assignor to the United
States of America as represented by the Secretary of
the Navy
Filed Oct. 21, 1963, Ser. No. 317,850
4 Claims. (Cl. 343—7.3)
(Granted under Title 35, U.S. Code (1952), sec. 266)

The invention herein described may be manufactured and used by or for the Government of the United States of America for governmental purposes without the payment of any royalties thereon or therefor.

The present invention relates to a radar tracking system and more particularly to a manual-aid for the acquisition and tracking control system of a tracking radar.

The ability to provide a radar operator with a simple and effective means of acquiring and tracking present day high-speed targets, especially in intentional or unintentional environments, is extremely desirable. Old methods used for positioning range gates do not provide the required instantaneous action, accuracy, and reliability for operator control. Also, the old methods are relatively complicated, awkward to operate, and only provide relatively limited functions.

The present invention comprises a resistance wire, across which is applied maximum range tracking voltage, positioned in front of a range scope. A manual probe connected to the range tracking detector enables the operator to pick off the wire a voltage corresponding to the gating voltage for that point on the scope trace. This invention, thereby, provides instantaneous and accurate positioning of the radar tracking gate, or gates, at any point within a selected range segment upon the operator's command.

It is an object of the invention, therefore, to provide a simple and effective manual-aid for the acquisition and tracking control system of a tracking radar.

Another object of the invention is to provide a novel manual probe tracking system.

A further object is to provide instantaneous and accurate positioning of radar tracking gates in a radar tracking system at any point within a selected range segment upon operator command.

Other objects and many of the attendant advantages of this invention will become readily appreciated as the same becomes better understood by reference to the following detailed description when considered in connection with the accompanying drawings wherein:

FIG. 2 shows a different embodiment of the invention of FIG. 1 using a spring loaded slider.

FIG. 3 is a view of the spring loaded slider taken along line 3—3 of FIG. 2.

FIG. 4 is a circuit diagram showing a simple potentiometer in place of the resistance strip of FIG. 1.

Referring now to the drawings, like numerals refer to like parts in each of the figures.

Figure 1:
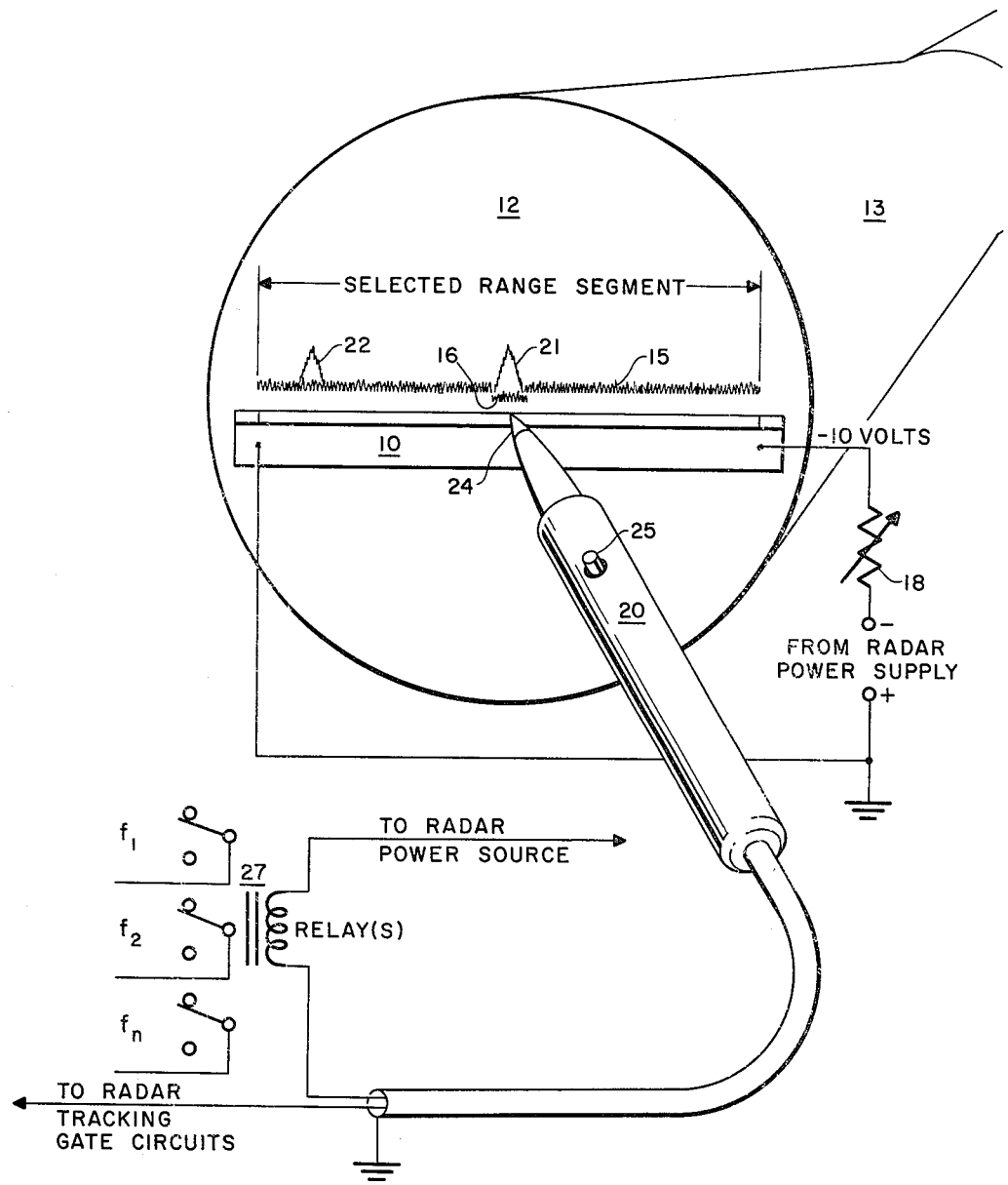
FIG. 1 is a diagrammatic illustration of one embodiment of the present invention showing a manual probe for connection to a tracking radar system.

One embodiment of the invention is as shown in FIG. 1. A resistance strip 10 constructed of closely-wound fine resistance wire for example, is mounted on a transparent face plate 12 of glass or plastic. Plate 12 is designed to fit directly over the face of a radar operator's indicator A-scope 13. The scope trace 15 is adjusted to be positioned just above resistance strip 10 as shown in FIG. 1. The resistance strip 10 is connected to a D.C. voltage source (from the radar power supply for example) which provides a voltage distribution along the strip directly proportional to the position of the tracking gate range 16 shown on the scope trace. The voltage distribution along resistance strip 10 is adjusted, by a calibrating adjustment means 18, to match the exact voltage in the radar ranging circuits which position the tracking gate in range within the selected range segment shown across the face of the scope.

In a typical tracking radar the output of the range tracking detector might vary from zero to —10 volts across the selected range segment. By adjusting the voltage across the resistance strip to —10 volts, the voltage at any point along the strip will be equal to the output of the range tracking detector when the range gate is at that same point on the scope trace 15. The normal position of the tracking gate would be at the center of the selected range segment. In this position the voltage at the output of the range tracking detector would be —5 volts; the voltage on the resistance strip would also be —5 volts at the center of the strip. Similarly, at any other point in the range segment the voltage at the output of the range tracking detector and the voltage at the corresponding point on the resistance strip will be equal.

By introducing, or in effect substituting, a control voltage, derived from a point on the resistance strip, for the voltage from the range tracking detector, the tracking gate 16 can be moved to the range position corresponding to that point on scope trace 15. This control voltage can be introduced into the range tracking detector by a wire conductor connected at one end to the range tracking detector and at the other end to a manual probe 20 which may be touched to any desired range position along resistance strip 10. In a typical situation the radar range gate 16 may be located at some point in the range segment and a desired target may be seen by the operator at some other point in range. By touching manual probe 20 to resistance strip 10 at a point just under the displayed target signal 21, the range gate 16 will be brought instantly coincidence with the target and automatic tracking of the target is in effect. If several targets 21 and 22 are located within the range segment, the operator can select any desired target, or move from one target to another, by using manual probe 20. Contact to resistive strip 10 must be made with hte probe point 24 each time gate 16 is to be shifted in range. The gate can be shifted in range continuously by sliding probe tip 24 along resistance strip 10.

Probe 20 as shown in FIG. 1 may also be equipped with a finger-tip control button switch 25 which will operate one or more relays 27 and thus control additional independent functions, $f_1, f_2 \ldots f_n$, related to the expected target tracking environments such as range and angle coast (usually required to coast through interference ahead of the target), initial target acquisition, reset functions, target reacquisition, etc.

This manual probe device can be connected in parallel to any radar ranging servo system utilizing a voltage to position the range tracking gate without affecting the normal functioning of the radar system. The main advantage of the invention over the old methods of radar operator aid is in the fact that a target can be selected instantly and accurately upon positioning the probe point 24 to the desired displayed target signal. This advantage provides fast initial target acquisition and reacquisition, particularly in the presence of interference (intentional or unintentional). This advantage also allows the operator to follow the desired target through a field of clutter, especially in cases where the radar would normally tend to lock and track the clutter signals. The operator also has "finger tip" control of other independent functions with button switch 25 mounted on the probe handle.

The invention operates in parallel to the automatic range tracking system of the radar. This means that the automatic tracking mode is always in effect, whether the probe is used or not. The probe is essentially a manual aid to the automatic tracking system.

The operator can hold the tracking gate 16 on the target position, 21 for example, with probe tip 24 during long target fades which normally causes the tracking gate to move away from the target position during the fade-out period. This provides smoother tracking data to associated computers and thus better accuracy in results. Also this effect provides extended target tracking beyond the normal range of the radar, since holding the gate on target during the fade-out period prevents the need for target reacquisition at the end of the target fade-out period.

FIGS. 2 and 3 show an alternative method to the invention. The probe is replaced by a sliding element 30 mounted on a trolley track 31 and making contact with the resistance strip 10. The results are similar to those obtained with probe 20 except that the slider method is slightly slower to manipulate than the probe method. The operator must first grasp knob 32 in his hand and then slide it to the desired range; then he must depress it to make contact. A switch used to carry out the functions of switch 25 on probe 20 can be mounted on the knob if desired but it is mechanically simpler to mount it on the radar console panel.

Another possible method is shown in FIG. 4. This method is probably the simplest to adapt but is the least effective. Using this method, the resistance strip 10 of FIG. 1 is replaced by a simple potentiometer 40 located at a convenient place on the operator's console, with a calibrated range scale corresponding to the selected range segment. The operator would position the range gate by turning the shaft of the potentiometer until the range gate moved to the desired position. However, this method does not provide the operator with a visual correlation of the target position and the proper position of the manual device used to move the range gate. Switch S–1 must be depressed to enable tracking gate operation. A switch to carry out the function of switch 25 on probe 20 shown in FIG. 1 must be added also, either on the knob of variable resistor potentiometer 40 or on the console panel.

Obviously many modifications and variations of the present invention are possible in the light of the above teachings. It is therefore to be understood that within the scope of the appended claims the invention may be practiced otherwise than as specifically described.

What is claimed is:

1. In a range tracking radar system a manual-aid for the instantaneous and accurate positioning of radar tracking gate signals at any point within a selected range segment upon operator command comprising in combination with the indicator scope of the tracking radar system:
   (a) a resistance strip mounted on a transparent plate directly in front of a radar indicator scope and positioned just below the trace on said scope,
   (b) a source of D.C. voltage across which said resistance strip is connected and which provides a voltage distribution along said strip directly proportional to the position of a tracking gate range indicated on the scope trace,
   (c) means for adjusting the voltage distribution along said resistance strip to match the exact voltage within said radar system which positions the tracking gate within said selected range segment on the indicator scope,
   (d) means for introducing a control voltage to move the tracking gate indicated on the scope trace to the position of said range tracking signal indicated on said scope trace,
   (e) said control voltage being derived from a particular point on said resistance strip which corresponds to the position of said range tracking signal indicated on the scope trace.

2. In a range tracking radar system a manual-aid for the instantaneous and accurate positioning of radar tracking gate signals at any point within a selected range segment upon operator command comprising in combination with the indicator scope of the tracking radar system:
   (a) a resistance strip mounted on a transparent plate directly in front of a radar indicator scope and positioned just below the trace on said scope,
   (b) a source of D.C. voltage across which said resistance strip is connected and which provides a voltage distribution along said strip directly proportional to the position of a tracking gate range indicated on the scope trace,
   (c) means for adjusting the voltage distribution along said resistance strip to match the exact voltage within said radar system which positions the tracking gate within said selected range segment on the indicator scope,
   (d) means for introducing a control voltage to move the tracking gate indicated on the scope trace to the position of said range tracking signal indicated on said scope trace,
   (e) said control voltage being derived from a particular point on said resistance strip which corresponds to the position of said range tracking signal indicated on the scope trace,
   (f) said means for introducing a control voltage comprising electrical contact means electrically connected at one end to the range tracking of said radar system and whose other end may be contacted to any position along said resistance strip which corresponds to the desired range, thus by contacting said electrical contact means to said resistance strip at a point corresponding to a range tracking (target) signal displayed on said radar scope said tracking gate is moved instantly to coincide with the range tracking signal and said tracking gate can be shifted in range continuously by moving said electrical contact means along said resistance strip.

3. A device as in claim 2 wherein means for the operation of one or more relays is provided with said electrical contact means for controlling additional independent functions related to tracking environments.

4. A manual-aid for use with radar range tracking systems for the instantaneous and accurate positioning of radar tracking gate signals at any point wherein a selected range segment upon operator command comprising in combination with the indicator scope of the tracking radar system:
   (a) a resistance strip mounted on a transparent plate directly in front of a radar indicator scope and positioned just below the trace on said scope,
   (b) a source of D.C. voltage across which said resistance strip is connected and which provides a voltage distribution along said strip directly proportional to the position of a tracking gate range indicated on the scope trace,
   (c) means for adjusting the voltage distribution along said resistance strip to match the exact voltage within said radar system which positions the tracking gate within said selected range segment on the indicator scope,
   (d) means for introducing a control voltage for moving the tracking gate indicated on the scope trace to the position of the range tracking signal indicated on said scope trace,
   (e) said control voltage being derived from a particular point on said resistance strip which corresponds to the position of said range tracking signal indicated on the scope trace,
   (f) said means for introducing a control voltage comprising electrical contact means electrically connected at one end to the range tracking of said radar system and whose other end may be contacted to any position along said resistance strip which corresponds to the desired range, thus by contacting said electrical contact means to said resistance strip at a point corresponding to a range tracking (target) signal displayed on said radar scope said tracking gate is moved instantly to coincide with the range tracking signal and said tracking gate can be shifted in range continuously by moving said electrical contact means along said resistance strip, (g) said means for introducing a control voltage being connected in parallel to any radar ranging servo system utilizing a voltage to position the range tracking gate without affecting the normal functioning of the radar system.

References Cited by the Examiner
UNITED STATES PATENTS 3,158,860　11/64　Thompson _____ 343—7.3

CHESTER L. JUSTUS, *Primary Examiner.*